(12) United States Patent
Lovejoy

(10) Patent No.: US 7,436,726 B1
(45) Date of Patent: Oct. 14, 2008

(54) CIRCUIT FOR AND METHOD OF READING DATA IN AN ASYNCHRONOUS FIFO INCLUDING A BACKUP ADDRESS CIRCUIT FOR RE-READING DATA

(75) Inventor: Michael L. Lovejoy, Albuquerque, NM (US)

(73) Assignee: Xilinx, Inc., San Jose, CA (US)

( * ) Notice: Subject to any disclaimer, the term of this patent is extended or adjusted under 35 U.S.C. 154(b) by 240 days.

(21) Appl. No.: 11/285,125

(22) Filed: Nov. 21, 2005

(51) Int. Cl.
*G11C 7/00* (2006.01)

(52) U.S. Cl. ............ 365/221; 365/230.02; 365/230.08; 711/156; 711/211

(58) Field of Classification Search ............ 365/189.07, 365/221 O, 230.01, 230.02 X, 230.08 X, 365/221, 230.02, 230.08; 711/156 X, 211 X, 711/156, 211
See application file for complete search history.

(56) References Cited

U.S. PATENT DOCUMENTS 6,434,642 B1 * 8/2002 Camilleri et al. ............ 710/57
6,961,280 B1 * 11/2005 Pan et al. ............ 365/230.02

OTHER PUBLICATIONS

Xilinx, Inc.; DS261; Product Overview; "PCI-X/PCI HalfBridge Reference Design for Virtex-II Pro, Virtex-II, and Vertex-E FPGAs"; (v1.0) Jun. 23, 2003; available from Xilinx, Inc., 2100 Logic Drive, San Jose, California 95124; pp. 1-11.

* cited by examiner

*Primary Examiner*—Van Thu Nguyen
(74) *Attorney, Agent, or Firm*—John J. King; Justin Liu

(57) ABSTRACT

A circuit for enabling reading data in an asynchronous FIFO memory of an integrated circuit is described. The circuit comprises a memory storing data in a plurality of slots having a corresponding plurality of addresses. A write address counter stores a write address count, while a read address counter stores a read address count. Finally, a backup circuit receives a read address associated with data read from a slot of the plurality of slots. According to an alternate embodiment, a most significant bit circuit is coupled to an output of the write address counter for setting the most significant bit of the write address. A method of reading data stored in an asynchronous FIFO memory of an integrated circuit is also disclosed.

17 Claims, 6 Drawing Sheets

CIRCUIT FOR AND METHOD OF READING DATA IN AN ASYNCHRONOUS FIFO INCLUDING A BACKUP ADDRESS CIRCUIT FOR RE-READING DATA

FIELD OF THE INVENTION

The present invention relates generally to memory devices, and in particular, to a circuit for and method of reading data in an asynchronous memory.

BACKGROUND OF THE INVENTION

Memory devices are important components of many integrated circuits or products having integrated circuits. Because memories are so significant to the operation of these devices, it is important that data stored in a memory device is correctly accessed. Data may be written to a memory and read from a memory using a single clock signal. Such memories enable synchronous data transfers. Data may also be asynchronously transferred in memory devices which receive data and output data using two separate asynchronous clocks. Asynchronous clocks generally not only have a different phase, but also have a different frequency.

Memory devices also have various protocols for outputting stored data. For example, an asynchronous first-in first-out (FIFO) memory is a memory device where a data sequence may be written to and retrieved from the memory in exactly the same order. Because no explicit addressing is required, the write and read operations may be completely independent and use unrelated clocks. While the concept of a FIFO is simple, the implementation of an asynchronous FIFO in an integrated circuit is often difficult. One common implementation of an asynchronous FIFO is a random access memory (RAM) having two independently clocked ports (i.e. one for writing and one for reading), and two independent address counters to steer write and read data. However, synchronizing and decoding the two ports operating at two asynchronous frequencies requires significant effort.

Further, many applications employing asynchronous FIFOs commonly require that data read from the FIFO must be re-read, and therefore the FIFO must have backup functionality. For example, backup functionality is often required in any application transferring data to an internal bus, such as any module of a circuit that pipelines data for transferring data and then restarting if data needs to be re-read. However, designing efficient, robust asynchronous FIFOs with backup capability is difficult. Conventional circuits for backing up data read from an asynchronous FIFO have significant limitations. According to a first conventional device, data backup registers, also commonly called shadow registers, are used to backup data read from the asynchronous FIFO. As shown in FIG. 1, data output from an asynchronous FIFO 102 or one of the data backup registers 104 is selected by a multiplexer 106. Consider an implementation of an asynchronous, 64-bit data width FIFO with backup functionality of 0-3 in a programmable logic device (PLD) such as a Virtex field programmable gate array (FPGA) available from Xilinx, Inc. of San Jose, Calif.

Accordingly, 192 data backup registers and 128 look-up tables (LUTs) for multiplexing the data backup register data are required for the asynchronous FIFO to be implemented in a programmable logic device (PLD). As will be described below, the use of data backup registers as shown in FIG. 1 requires significant resources when the asynchronous FIFO with backup functionality is implemented in a programmable logic device (PLD).

According to a second conventional device as shown for example in FIG. 2, a two-FIFO per data path design is implemented. A first synchronous FIFO 202 with backup capability is used to recover data when necessary. A second FIFO 204 is an asynchronous FIFO that performs the function of moving data across time-domains. Further, when employing this approach, the number of FIFOs is duplicated for each direction of data flow. The use of two pairs of FIFOs per data path not only results in greater core size, but also results in increased latency. Accordingly, conventional devices use significant resources to recover data by backing up data stored in the FIFO.

Accordingly, there is a need for an improved circuit and method of enabling reading data in an asynchronous FIFO memory with backup functionality of an integrated circuit.

SUMMARY OF THE INVENTION

A circuit for enabling reading data in an asynchronous FIFO memory of an integrated circuit is described. The circuit comprises a memory storing data in a plurality of slots having a corresponding plurality of addresses. A write address counter increments a write address, while a read address counter increments a read address. Finally, a backup circuit receives a read address associated with data read from a slot of the plurality of slots. The backup circuit may also comprise a plurality of registers coupled to the read address counter. When a plurality of read addresses are stored, a multiplexer coupled to the read address counter receives the plurality of read addresses stored in the plurality of registers. A selection signal is coupled to the multiplexer to select an address for previously read data. According to another aspect of the circuit, the backup circuit generates a first enable signal which disables the plurality of registers when re-reading data, while a second enable signal enables the counter when reading data and re-reading data.

According to an alternate embodiment, a circuit for re-reading data in an asynchronous FIFO memory of an integrated circuit comprises a memory storing data in a plurality of slots having a corresponding plurality of addresses, and write and read address counters. A backup circuit comprises a plurality of registers coupled to the read address counter and storing a plurality of read addresses. The backup circuit enables reloading read addresses to restore data that was previously read. A most significant bit circuit is coupled to an output of the write address counter for setting the most significant bit of the write address to provide circular FIFO operation. The backup circuit preferably generates the most significant bit of the write address based upon the number of bits re-read from the memory, and generates a reset signal after a backup step when necessary. The backup circuit also preferably generates a first enable signal coupled to the plurality of registers disabling the plurality of registers when re-reading data, and a second enable signal enabling the counter when reading and re-reading data.

A method of reading data stored in an asynchronous FIFO memory of an integrated circuit is also disclosed. The method comprises steps of receiving a read address for reading data from the memory; registering the read address to enable reloading the read address in response to a request to re-read the data; and re-reading data associated with the read address. After receiving a request to re-read data, a backup read address is preferably loaded into the read address counter and data associated with the read address is re-read. The backup register is preferably disabled and the read counter remains enabled during re-reading. According to another aspect of the method, a most significant bit of a write address generated by the write address counter is selected when re-reading data.

DETAILED DESCRIPTION OF THE DRAWINGS

Figure 1:
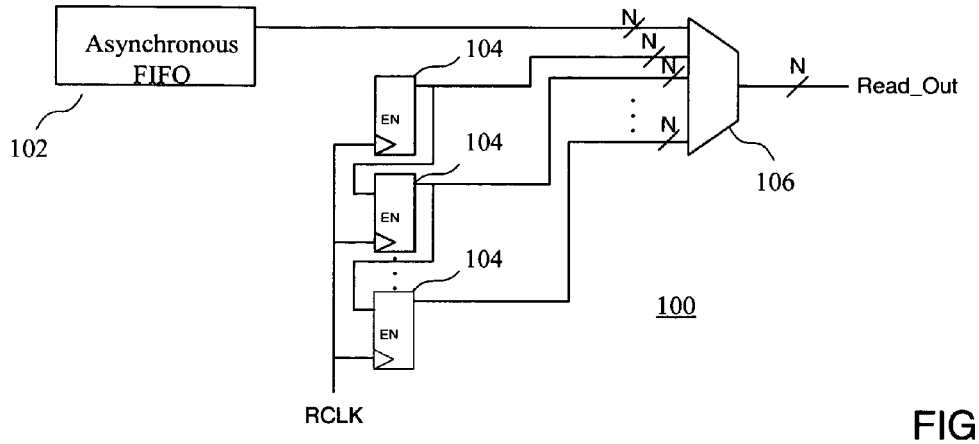
FIG. 1 is a conventional circuit for restoring data read from an asynchronous FIFO with backup data registers.
Figure 2:
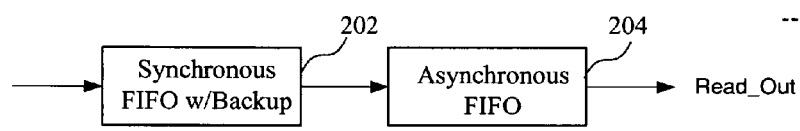
FIG. 2 is another conventional circuit for restoring data read from an asynchronous FIFO.
Figure 3:
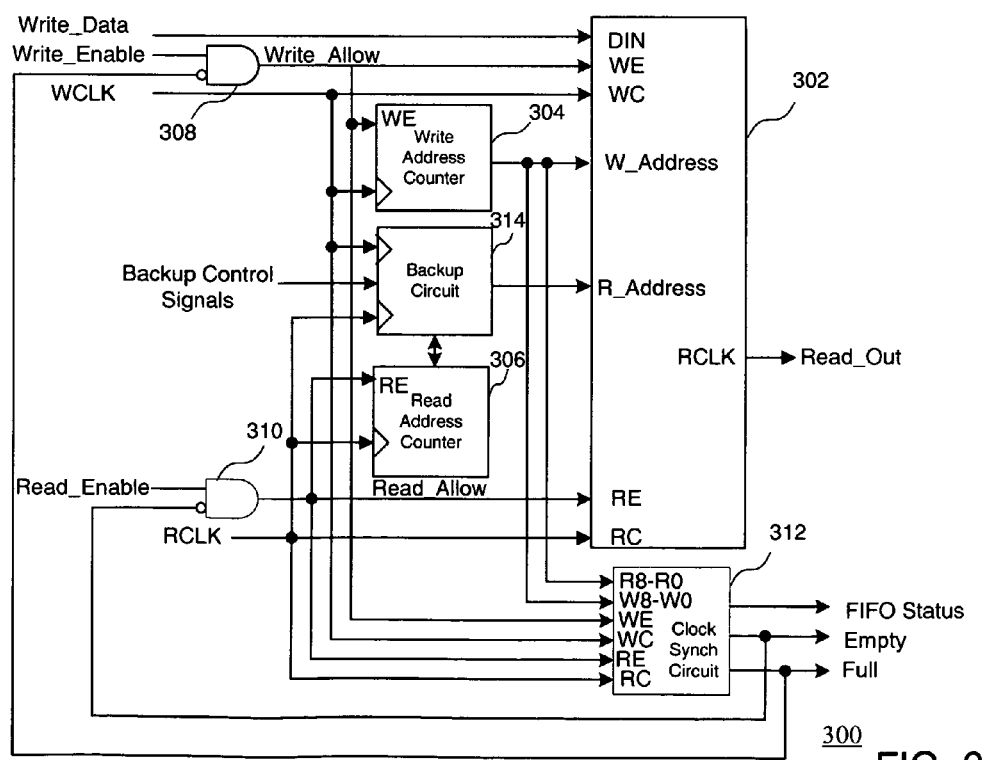
FIG. 3 is a block diagram of a circuit for re-reading data of an asynchronous FIFO having backup address functionality according to an embodiment of the present invention.

Turning first to FIG. 3, a block diagram of a circuit for re-reading data of an asynchronous FIFO according to an embodiment of the present invention is shown. In particular, memory device 300 comprises a dual-port RAM 302 having a write address counter 304 and a read address counter 306. A pair of AND gates 308 and 310, which receive write and read enable signals, respectively, as well as Empty and Full signals generated by a clock synchronization circuit 312, generate a Write_Allow signal and a Read_Allow signal. The dual port RAM is controlled by the Write_Allow signal applied to its write enable (WE) terminal, a write clock (WCLK) signal applied to its write clock (WC) terminal, the Read_Allow signal applied to its read enable (RE) terminal, and a read clock (RCLK) signal applied to its read clock (RC) terminal. In addition, memory device 300 receives a binary write address W_Address from write address counter 304, and a binary read address R_Address from read address counter 306.

During write operations, the Write_Allow signal is generated by the first AND gate 308 in response to an externally generated Write_Enable input signal and an inverted Full control signal generated by the clock synchronization circuit 312. RAM 302 stores a Write_Data value applied at its data in (DIN) port in a memory location identified by binary write address W_Address when the Write_Allow signal is asserted (i.e., when the Write_Enable signal is high and the FULL control signal is low). In contrast, data signals received at the DIN port of RAM 302 are ignored when the Write_Allow signal is not asserted (i.e., when either the FULL control signal is high or the Write_Enable signal is de-asserted).

Similarly, during read operations, the Read_Allow signal is generated by a second AND gate 310 in response to an externally generated Read_Enable input signal and an inverted Empty control signal, where the Empty control signal is also generated by the clock synchronization circuit 312. Memory device 300 transmits a word from the memory location identified by binary read address R_Address through its data output (DOUT) port when the Read_Allow signal is asserted (i.e., when the Read_Enable signal is high and the Empty control signal is low). In contrast, the binary read address R_Address is ignored by RAM 300 when the Read_Allow signal is not asserted (i.e., when either the Empty control signal is high or the Read_Enable signal is low). The clock synchronization circuit 312 generates the Full and Empty control signals, as will be described in more detail below.

Figure 7:
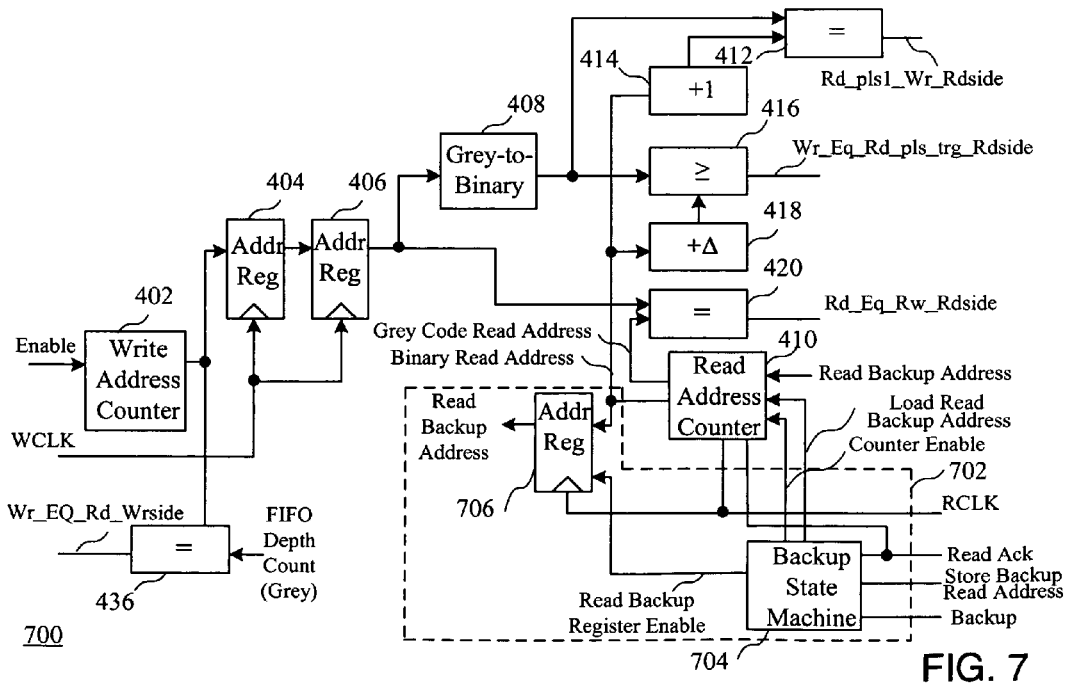
FIG. 7 is a block diagram of a circuit for re-reading blocks of data of an asynchronous FIFO having a backup address register according to an embodiment the present invention.

According to one aspect of the circuit, the read address is buffered in backup registers to provide backup address information, unlike conventional circuits which have backup registers for backing up data. The address information is available to a backup state machine that controls loading the binary read address counter, generating the read address, and advancing the information in the address backup registers. In particular, a backup circuit 314 receives Backup Control Signals and outputs a read address, as will be described in more detail below. In addition to passing data across time-domain boundaries, the backup circuitry provides backup capability of an arbitrary number of address steps from 0 to N as will be described in reference to FIG. 4, backup capability of a circular FIFO for unlimited virtual depth as will be described in reference to FIG. 5, and backup capability of a large blocks of data, as will be described in reference to FIG. 7. Address information is moved across time-domain boundaries by the backup circuit to realize the asynchronous data transfer. That is, the bookkeeping of the address information by the backup circuit allows backup functionality (including mark and restore for large blocks of data) and robust transfer of data across time-domain boundaries. All of these functionalities are provided in a design that utilizes significantly lower resource requirements and realizes lower latency than conventional designs.

Figure 4:
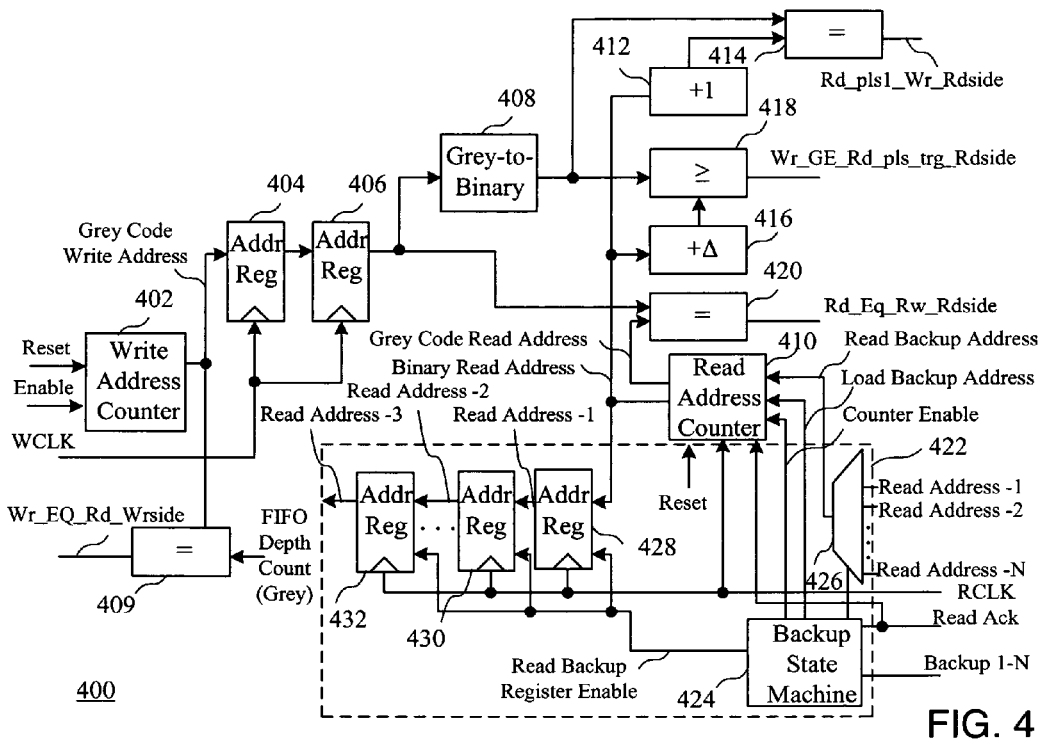
FIG. 4 is a block diagram of a circuit for re-reading data of an asynchronous FIFO having backup address registers according to an embodiment of the present invention.

Turning now to FIG. 4, a block diagram of a circuit for re-reading data of a FIFO having backup registers according to an embodiment of the present invention is shown. The circuit preferably uses conventional binary counters and may have both Grey code and binary outputs for both write and read address generation. In particular, a write address counter 402 coupled to receive a write enable signal generates a write address. The use of binary address counting is well-suited for high-speed comparators (both equality and inequality) implemented in programmable logic devices such as FPGAs using a carry chain. In order to implement a robust, asynchronous FIFO design, the address that is passed across time-domains is preferably Grey code encoded. Accordingly, a double register synchronizer comprising registers 404 and 406 couples the write address to the Binary-to-Grey (B2G) converter 408. Both Binary-to-Grey and Grey-to-binary (G2B) conversions are preferably performed with high-speed in the fabric of an FPGA if the FIFO is implemented in an FPGA, such as the Virtex-4 FPGA product from Xilinx, Inc. of San Jose, Calif.

The circuit of FIG. 4 includes a variety of comparators for both common flags and specific flags for a users circuit design, such as flags related to the empty and full state of a FIFO. In particular, an equality comparator 409 is coupled to receive the Grey code output of the write address counter 402 and a Grey code FIFO depth count to generate a Wr_EQ_Rd_Wrside signal indicating a FIFO full condition. The binary read address output of a read address counter 410 is also coupled to an incrementor circuit 412, the output of which is coupled to an equality comparator 414 which generates a signal Rd_pls1_Wr_Rdside, indicating that there is only one address remaining to be read. The binary read address is also coupled to a delta incrementor 416, the output of which is coupled to a greater than or equal to comparator 418. The comparator 418 determines whether the binary write address count output by the grey-to-binary converter 408 is greater than or equal to the binary read address plus some delta value, to generate the Wr_GE_Rd_pis_trg_Rdside comprising a FIFO Almost Empty flag. The delta value may be any number which may be determined by a user of the circuit. It should be noted that the actual read addresses, and not an earlier read address from a backup register, are used to generate the signal Rd_pls1_Wr_Rdside and the signal Wr_G-E_Rd_pls_trg_Rdside. Because the backup of read addresses depends only on addresses that have been read, and not on a backup address, comparators 418 and 420 only depend on the maximum address that was read. Finally, the equality comparator 420 is used to compare the binary write address output by the write address counter 402 and the binary read address output by the read counter 410. The equality comparator 420 generates an output signal Rd_EQ_Rw_Rdside comprising a FIFO empty flag.

The backup circuit 422 is also included to enable re-reading data from the FIFO as described above. In particular, a backup state machine 424, which will be described in more detail in reference to FIG. 6, receives control signals from a controller of a device incorporating the FIFO, such as a processor of a programmable logic device, which will be described in more detail in reference to FIG. 8. The backup state machine receives a signal indicating a read acknowledge has been received to enable continuing to read from the FIFO, or a Backup 0-N signal indicating that a backup is required. The Backup 0-N signal indicates the number of addresses to backup. If a backup is required, the state machine will select an input to a multiplexer 426, based upon the number of addresses which need to be re-read. The inputs to the multiplexer 426 will be values of the addresses stored in the backup address registers for data which has already been read. In particular, N backup address registers 428, 430 and 432 storing addresses of data read from the FIFO may be selected to enable re-reading of data when a backup request is made. For example, register 428 would store a Read Address-1 (i.e. one address before the current address), register 430 would store Read Address-2, etc. The backup address registers would be five bits wide in a circuit having a five bit address, for example. The backup request is made when a module of the integrated circuit employing the FIFO determines that data should be re-read.

When a request to re-read data is made, a Load Backup Address signal is provided from the backup state machine to the address counter 410 instructing the address counter to load a Read Backup Address value. The Read Address Counter 410 is continued to be enabled during the re-reading of data, allowing the count to advance until all of the data has been re-read. However, the backup address registers are not clocked, allowing the registers to store the addresses for previously read data which is re-read. The Backup Register Enable generated by the backup state machine is then enabled after the backup to allow the read addresses to be loaded into the backup registers. The output of the last backup register is coupled to a Binary-to-Grey converter 434 (see FIG. 5) to generate the read address as a Grey coded value. Accordingly, a predetermined number of addresses for data which has been read is stored in backup registers, and a state machine controls the re-reading of data from an address where a module using the FIFO has requested a re-read.

Figure 5:
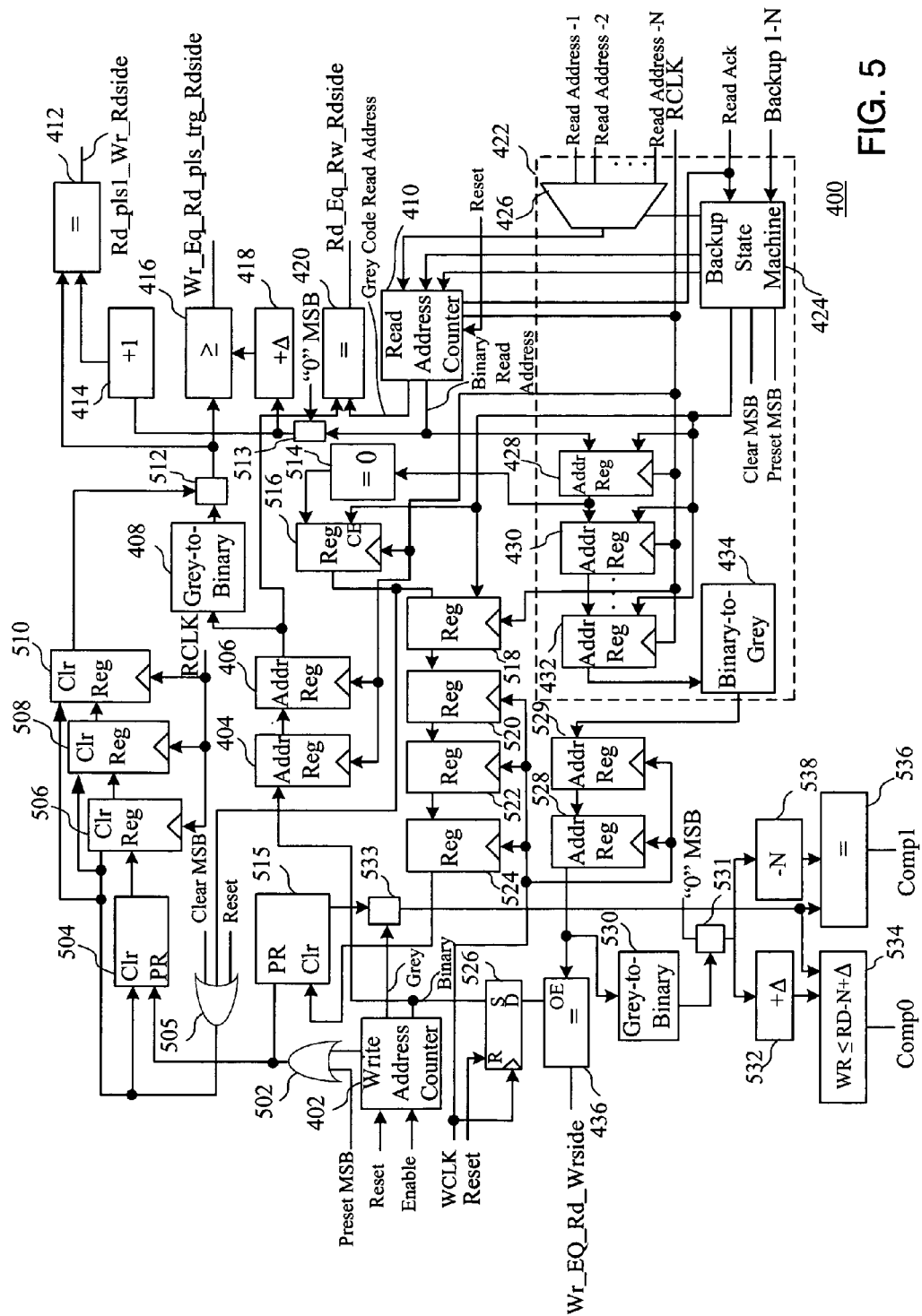
FIG. 5 is a block diagram of a circuit for re-reading data of an asynchronous circular FIFO having backup address registers according to an embodiment of the present invention.

Turning now to FIG. 5, a block diagram of a circuit for re-reading data of a circular FIFO having backup address registers according to an embodiment of the present invention is shown. In order to enable a circular FIFO, it is required that the read address be passed back to the write-side of the circuit. In addition, an additional bit, particularly the most significant bit (MSB) of a write address, must be generated in response to an address wrapping around the actual FIFO depth. In particular, an OR gate 502 is coupled to receive an output of the Write Address Counter 402 which is set to zero after counter is reset. The OR gate 502 also receives a Preset MSB, which may be required in the event that the read address is backed up such that it goes past the initial memory location, and therefore appears to be a number greater than the write address. The Preset MSB is initially set to zero.

In a situation where an address wraps around the actual FIFO depth in a circular FIFO, it is necessary to change the most significant bit of the write address to indicate that the read address is actually behind the write address. The most significant bit output by the OR gate is coupled to a register 504. As will be described in more detail below, the register 504 for storing the most significant bit of the write address will be cleared under circuit conditions based upon the output of an OR gate 505. The output of register 504 is coupled to a pair of synchronizing registers 506 and 508 for enabling crossing between time domains, as is well known in the art. A third optional register 510 may be used depending the application of the circuit to ensure that most significant bit does not arrive before the write address when concatenating the most significant bit and the write address. A concatenating circuit 512 combines the most significant bit output by the series of registers with the output of the Grey-to-Binary converter 408. Because the most significant bit of the read address will never need to be changed, it will be set to zero. Accordingly, a concatenating circuit 513 combines a most significant bit of zero with the binary output of the read address counter 410.

The most significant bit of the write address must be cleared to zero under certain conditions. The most significant bit is reset by a Reset signal which is also used to reset the Write Address Counter and the Read Address Counter. A reset signal will also be generated when the read address is equal to the first location of the circular FIFO indicating that the read address has returned to the same "cycle" of the circular FIFO as the write address. Accordingly, when the Read Address-1 signal output by the register 428 is equal to zero as determined by a comparator 514, a clear signal is coupled to a register 516, the output of which is coupled to the OR gate 505 in order to reset register 504 storing the most significant bit for the write address. However, because the backup address registers 428-432 are not advanced during the backup process, the backup state machine will preferably generate a Clear MSB signal after the read address has returned to the same "cycle" of the circular FIFO as the write address during a backup. The output of register 516 is also coupled to a series of registers 518-524 enabling synchronizing between the different clock domains. The output of the last register 524 is coupled to clear the register 515 which also stores the most significant bit of the write address and is used for generating an almost empty signal, as will be described below.

According to the embodiment of FIG. 5, the write address is coupled to a register 526 generating an initial output enable signal coupled to a full flag comparator. In particular, an initial OE signal generates an output enable signal for the equality comparator 436 when data is initially written to the FIFO. It is also often useful to generate signals which indicate when a FIFO is almost full or almost empty. In particular, the read address-N output by the synchronizing registers 528 and 529 is coupled to a Grey-to-Binary converter 530, the output of which is coupled to a concatenating circuit 531 which combines the binary read in the write time domain with a "0" MSB. An adder circuit 532 for incrementing the read address-N value having a "0" MSB by a predetermined delta representing the amount that data which would need to remain before an Almost Empty flag would be generated. After a most significant bit stored in register 515 is combined with a write address by a concatenating circuit 533, a comparator 534 determines whether the write address is greater than or equal to the read address-N plus the delta, where N is the number or addresses which are backed up. The output of the comparator represents an Almost Empty flag. Similarly, in order to generate an Almost Full condition, a comparator 536 compares an output of a subtractor 538 which subtracts N from the Grey code write address having a MSB of "0." The output of the comparator is an Almost Full signal. For the circuit of FIG. 5 implemented in an FPGA having an 8 bit address and configured to backup three addresses, only 24 backup registers and 16 LUTs are required. Accordingly, the circuit of FIG. 5 reduces the CLB requirement from 320 CLB (in a conventional circuit employing shadow registers) to 40 CLB, resulting in a significant resource reduction for configurable logic blocks of an FPGA.

Figure 6:
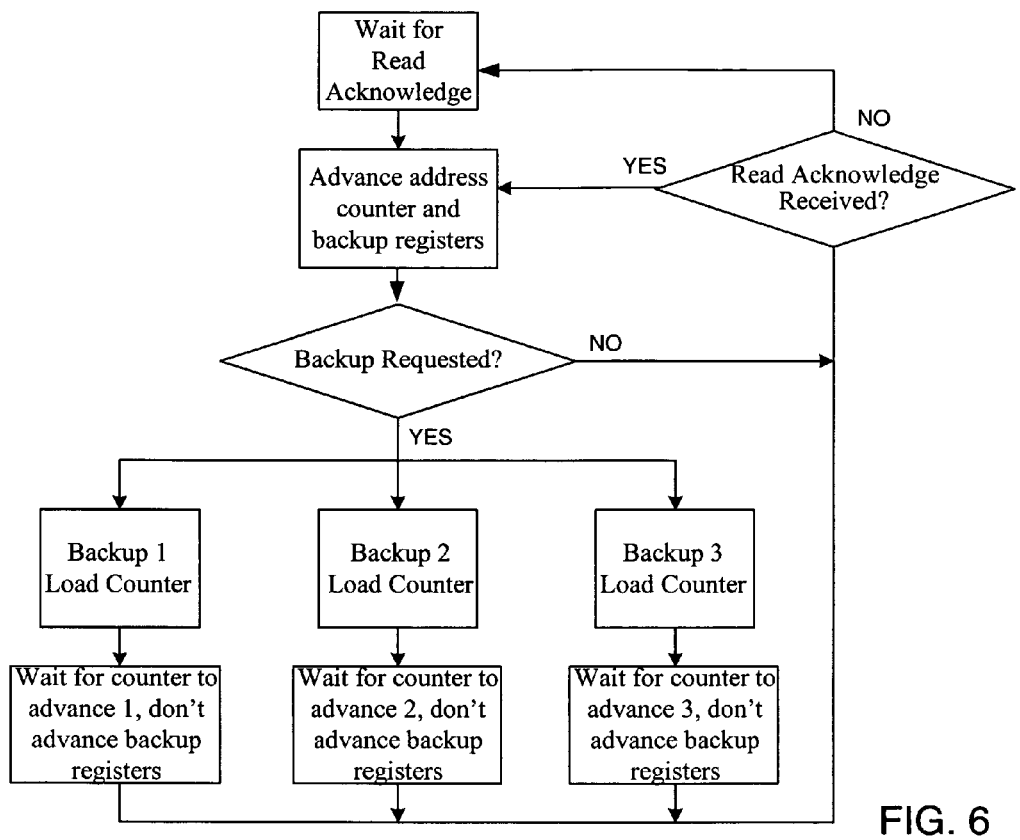
FIG. 6 is a state diagram showing the operation of a backup state machine for re-reading data according to an embodiment of the present invention.

Turning now to FIG. 6, a state diagram shows the operation of a backup state machine 424 of FIG. 5 according to an embodiment of the present invention for a FIFO with backup functionality of 1-3 addresses. After originally receiving a read enable to read data from the FIFO, the address of the address counter is advanced and the registers are clocked to load the addresses. It is then determined whether a backup is requested in re-reading data from the FIFO. If so, the address loaded into the counter is backed up by some value, such as any value between 1 and 3 in the example of FIG. 6. In each case, the backup address registers are not advanced while the read address counter is advanced to allow the data associated with selected addresses in the backup address registers to be re-read. After reloading the read addresses and synchronizing the read counter during backup, the state machine then waits for an enable to continue reading data from the FIFO.

According to another embodiment, other functions, such as "mark and restore" required for large packet based systems such as 10/100 Ethernet and ATM cores, are implemented. According to the embodiment of FIG. 7, a backup circuit 702 comprises a backup state machine 704 controlling the read address counter 410 and only a single backup register 706. That is, only a single address associated with the start of a large block of data is stored in the backup register 706. Because it may be determined that an error occurred in reading the large block of data, it is only necessary to register one address for an entire block of data to be re-read. If a backup is required, the state machine will provide a Load Read Backup Address signal to the address counter 410 instructing the address counter to load the Read Backup Address value. The Read Address Counter 410 will be enabled to allow the read address to advance while the data associated with the reloaded addresses is read. While the counter is enabled during backup, the backup registers are disabled during backup so that the read addresses can be used to re-read data until all data is re-read. The backup state machine of the embodiment of FIG. 7 enables re-reading the block of data in response to a Backup signal.

Figure 8:
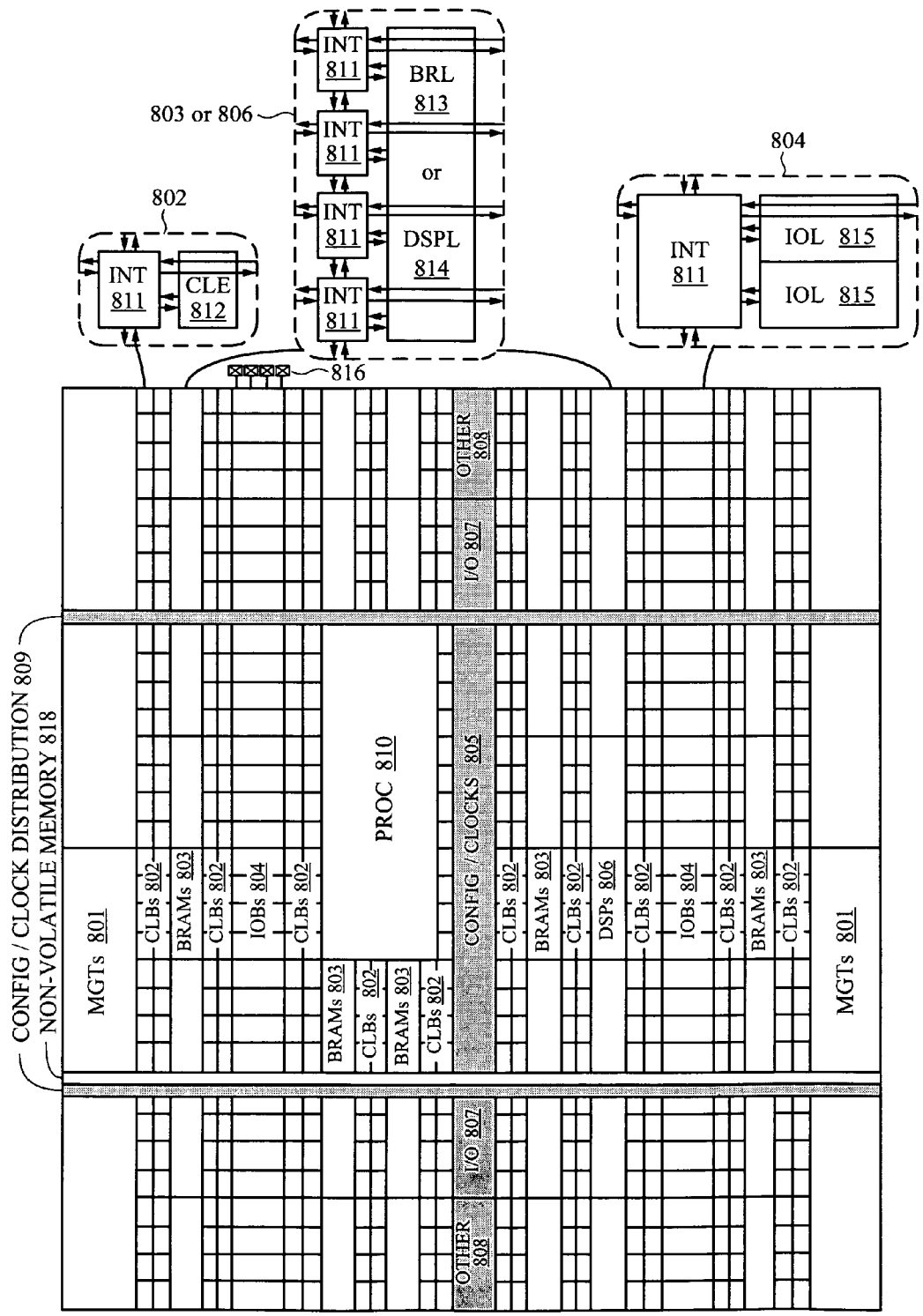
FIG. 8 is a block diagram of a programmable logic device implementing a circuit for re-reading data according to an embodiment of the present invention.

Turning now to FIG. 8, is a block diagram of a programmable logic device implementing a circuit for reading data according to an embodiment of the present invention is shown. In particular, advanced FPGAs may include several different types of programmable logic blocks in the array. For example, FIG. 8 illustrates an FPGA architecture 800 that includes a large number of different programmable tiles including multi-gigabit transceivers (MGTs 801), configurable logic blocks (CLBs 802), random access memory blocks (BRAMs 803), input/output blocks (IOBs 804), configuration and clocking logic (CONFIG/CLOCKS 805), digital signal processing blocks (DSPs 806), specialized input/output blocks (I/O 807) (e.g., configuration ports and clock ports), and other programmable logic 808 such as digital clock managers, analog-to-digital converters, system monitoring logic, and so forth. Some FPGAs also include dedicated processor blocks (PROC 810). A FIFO described above having backup capability may be implemented in block random access memory (BRAM) or distributed RAM based memory in configurable logic blocks.

In some FPGAs, each programmable tile includes a programmable interconnect element (INT 811) having standardized connections to and from a corresponding interconnect element in each adjacent tile. Therefore, the programmable interconnect elements taken together implement the programmable interconnect structure for the illustrated FPGA. The programmable interconnect element (INT 811) also includes the connections to and from the programmable logic element within the same tile, as shown by the examples included at the top of FIG. 8.

For example, a CLB 802 may include a configurable logic element (CLE 812) that may be programmed to implement user logic plus a single programmable interconnect element (INT 811). A BRAM 803 may include a BRAM logic element (BRL 813) in addition to one or more programmable interconnect elements. Typically, the number of interconnect elements included in a tile depends on the height of the tile. In the pictured embodiment, a BRAM tile has the same height as four CLBs, but other numbers (e.g., five) may also be used. A DSP tile 806 may include a DSP logic element (DSPL 814) in addition to an appropriate number of programmable interconnect elements. An IOB 804 may include, for example, two instances of an input/output logic element (IOL 815) in addition to one instance of the programmable interconnect element (INT 811). As will be clear to those of skill in the art, the actual I/O pads 816 connected, for example, to the I/O logic element 815 are manufactured using metal layered above the various illustrated logic blocks, and typically are not confined to the area of the input/output logic element 815.

In the pictured embodiment, a columnar area near the center of the die (shown shaded in FIG. 8) is used for configuration, clock, and other control logic. Horizontal areas 809 extending from this column are used to distribute the clocks and configuration signals across the breadth of the FPGA. Some FPGAs utilizing the architecture illustrated in FIG. 8 include additional logic blocks that disrupt the regular columnar structure making up a large part of the FPGA. The additional logic blocks may be programmable blocks and/or dedicated logic. For example, the processor block PROC 810 shown in FIG. 8 spans several columns of CLBs and BRAMs. Finally, a non-volatile memory 818 may be employed for on-chip storage of configuration data which is used to configure the configuration logic blocks or other programmable tiles as described above.

Note that FIG. 8 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 8 are purely exemplary. For example, in an actual FPGA more than one adjacent column of CLBs is typically included wherever the CLBs appear, to facilitate the efficient implementation of user logic. Similarly the circuits and methods of the present invention may be implemented in any device, including any type of programmable logic device, having configuration memory.

Figure 9:
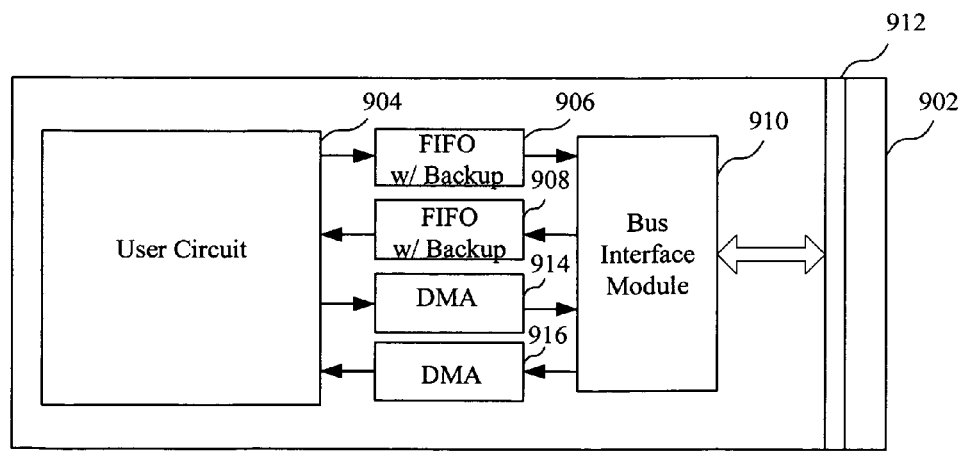
FIG. 9 is a circuit for implementing a FIFO having backup capability according to an embodiment of the present invention.

Turning now to FIG. 9, a circuit for implementing a FIFO having backup capability according to an embodiment of the present invention is shown. A circuit 902, which may be any type of integrated circuit, such as a programmable logic device or an application specific integrated circuit, comprises a user circuit 904 and a pair of FIFOs having backup circuitry. For example, a first FIFO 906 enables the transfer of data from user circuit 904 to a bus module 901 and a corresponding bus 912. Similarly, a second FIFO 908 enables the transfer of data from the bus interface module 910 to the user circuit 904. The FIFOs 906 and 908 may be implemented according to any of the embodiments of FIGS. 3-6 and may be implemented in a configurable logic block of FIG. 8. Finally, the circuit 902 may include direct memory access (DMA) circuits 914 and 916 as is well known in the art.

Figure 10:
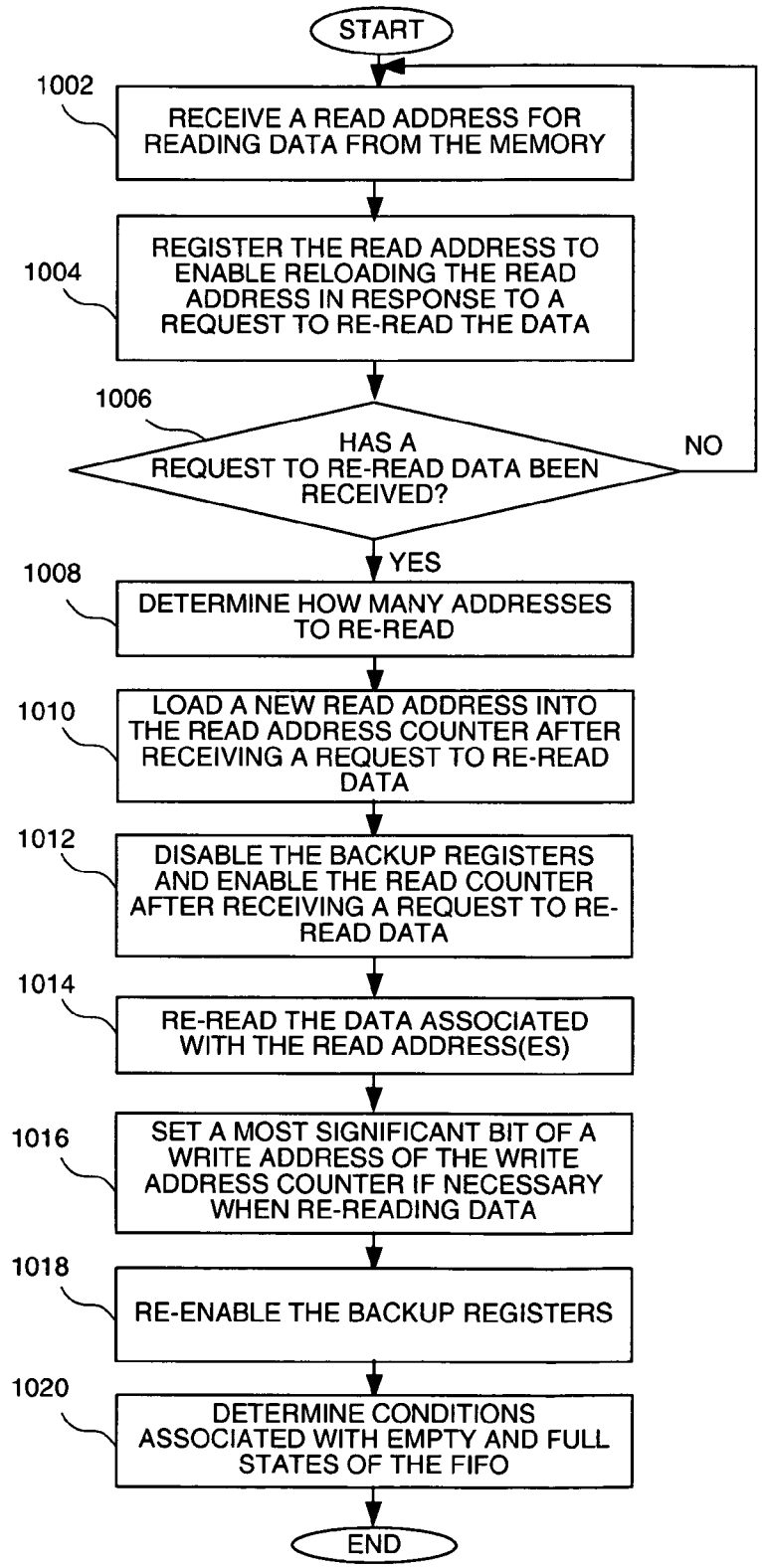
FIG. 10 is a flow chart showing a method of re-reading data according to an embodiment the present invention.

Turning now to FIG. 10, a flow chart shows a method of reading data according to an embodiment the present invention. The method of FIG. 10 could be employed using a circuit of FIGS. 3-6, or some other suitable circuit. A read address for reading data from the memory is received at a step 1002. The read address is registered to enable reloading the read address in response to a request to re-read data at a step 1004. It is then determined whether a request to re-read data is received at a step 1006. The number of addresses to be re-read is determined at a step 1008. A Backup Read Address is loaded into the read address counter after receiving a request to re-read data at a step 1010. The backup registers are disabled and the read counter is enabled after a request to re-read data is received at a step 1012. The data associated with the read address is re-read at a step 1014. In the case of a circular FIFO, a most significant bit of a write address of the write address counter is set, if necessary, when re-reading data at a step 1016. The backup registers are re-enabled after data associated with certain addresses have been re-read at a step 1018. Finally, conditions associated with empty and full states of the FIFO are determined at a step 1020.

The methods and circuits described above are well-suited for a wide range of applications while providing the flexibility to remove unneeded features which reduces the resource requirement. When implemented in a programmable logic device, such as an FPGA, a significant reduction in resources can be realized as compared to conventional circuits. Furthermore, the design is much lower latency than conventional designs that include backup functionality having two FIFOs. In general, this design is well-suited for smaller, faster data interfaces, most communication cores and PCI interfaces. It can therefore be appreciated that the new and novel circuit and method of reading data in an asynchronous FIFO has been described. It will be appreciated by those skilled in the art that numerous alternatives and equivalents will be seen to exist which incorporate the disclosed invention. As a result, the invention is not to be limited by the foregoing embodiments, but only by the following claims.

The invention claimed is:

1. A circuit for enabling reading data in an asynchronous FIFO memory of an integrated circuit, said circuit comprising:
   a memory storing data in a plurality of slots having a corresponding plurality of addresses;
   a write address counter incrementing a write address;
   a read address counter incrementing a read address; and
   a backup circuit receiving a read address associated with data read from a slot of said plurality of slots;
   wherein said backup circuit comprises a backup state machine for receiving a backup request and a plurality of registers coupled to said read address counter, said plurality of registers storing a plurality of read addresses associated with data read from said plurality of slots, one address of said addresses stored in said plurality of registers being selected to be a first address for data to be re-read.

2. The circuit of claim 1 further comprising a multiplexer coupled to said read address counter, said multiplexer receiving said plurality of read addresses stored in said plurality of registers.

3. The circuit of claim 2 wherein said backup circuit couples a selection signal to said multiplexer to select a previously loaded address.

4. The circuit of claim 3 wherein said backup circuit generates a first enable signal coupled to said plurality of registers, said first enable signal disabling said plurality of registers when re-reading data.

5. The circuit of claim 4 wherein said backup circuit generates a second enable signal, said second enable signal enabling said counter when reading and re-reading data associated with addresses stored in said plurality of registers.

6. The circuit of claim 1 wherein said circuit comprises a circuit implemented in programmable logic of a programmable logic device.

7. A circuit for backing up data in an asynchronous FIFO memory of an integrated circuit, said circuit comprising:
   a memory storing data in a plurality of slots having a corresponding plurality of addresses;
   a write address counter incrementing a write address;
   a read address counter incrementing a read address;
   a backup circuit comprising a plurality of registers coupled to said read address counter and storing a plurality of read addresses, said backup circuit enabling reloading read addresses; and
   a most significant bit circuit coupled to an output of said write address counter, said most significant bit circuit setting the most significant bit of said write address;
   wherein said backup circuit generates said most significant bit of said write address based upon the number of bits re-read from said memory.

8. The circuit of claim 7 wherein said backup circuit generates a reset signal to reset said most significant bit of said write address after re-reading data.

9. The circuit of claim 7 wherein said backup circuit generates a first enable signal coupled to said plurality of registers, said first enable signal disabling said plurality of registers when re-reading data.

10. The circuit of claim 9 wherein said backup circuit generates a second enable signal, said second enable signal enabling said read address counter when reading data and re-reading data.

11. The circuit of claim 7 further comprising a circuit coupled to said write address counter indicating a full condition of said FIFO memory.

12. The circuit of claim 7 further comprising a circuit coupled to said read address counter indicating an empty condition of said FIFO memory.

13. A method of reading data stored in an asynchronous FIFO memory of an integrated circuit, said method comprising the steps of:
   receiving a read address for reading data from a memory;
   registering said read address to enable reloading said read address in response to in response to a request to re-read data;
   re-reading data associated with said read address; and setting a most significant bit of a write address of said FIFO when re-reading data;
wherein said most significant bit of said write address is based upon the number of bits re-read.

14. The method of claim 13 further comprising a step of receiving a request to re-read data associated with said read address.

15. The method of claim 14 further comprising a step of incrementing said read address.

16. The method of claim 14 further comprising a step of loading a new read address into said read address counter after receiving a request to re-read data.

17. The method of claim 14 further comprising a step of disabling a register storing said read address and enabling said read counter after receiving a request to re-read data.

* * * * *